(12) United States Patent
Petellaz

(10) Patent No.: US 10,494,085 B2
(45) Date of Patent: Dec. 3, 2019

(54) BLADE PITCH CONTROL

(71) Applicant: Ratier-Figeac SAS, Figeac (FR)

(72) Inventor: Bruno Petellaz, Beduer (FR)

(73) Assignee: RATIER-FIGEAC SAS, Figeac (FR)

( * ) Notice: Subject to any disclaimer, the term of this patent is extended or adjusted under 35 U.S.C. 154(b) by 170 days.

(21) Appl. No.: 15/444,591

(22) Filed: Feb. 28, 2017

(65) Prior Publication Data

US 2017/0313405 A1 Nov. 2, 2017

(30) Foreign Application Priority Data

May 2, 2016 (EP) .................................... 16305508

(51) Int. Cl.
*B64C 11/36* (2006.01)
*B64C 11/06* (2006.01)
*B64C 11/30* (2006.01)

(52) U.S. Cl.
CPC .............. *B64C 11/36* (2013.01); *B64C 11/06* (2013.01); *B64C 11/30* (2013.01)

(58) Field of Classification Search
CPC ......... B64C 11/04; B64C 11/06; B64C 11/30; B64C 11/32; B64C 11/36; B64C 11/38; B64C 11/42
USPC ........ 416/157 R, 164–165, 167, 168 A, 175, 416/203
See application file for complete search history.

(56) References Cited

U.S. PATENT DOCUMENTS

| | | | | |
|---|---|---|---|---|
| 1,893,184 A * | 1/1933 | Smellie | ................. | F04D 29/666 |
| | | | | 181/209 |
| 3,536,417 A * | 10/1970 | Merkle | ................. | F04D 29/284 |
| | | | | 415/119 |
| 3,876,334 A | 4/1975 | Andrews | | |
| 4,253,800 A * | 3/1981 | Segawa | ..................... | F01D 5/10 |
| | | | | 415/119 |
| 5,199,850 A | 4/1993 | Carvalho et al. | | |
| 5,306,119 A * | 4/1994 | Bandoh | ................... | B64C 11/00 |
| | | | | 415/119 |
| 5,667,361 A * | 9/1997 | Yaeger | ..................... | F01D 5/22 |
| | | | | 416/193 R |
| 5,681,145 A * | 10/1997 | Neely | .................... | F04D 29/328 |
| | | | | 415/119 |
| 5,966,525 A * | 10/1999 | Manzi, Jr. | ................. | F01D 5/10 |
| | | | | 415/119 |
| 7,296,969 B2 | 11/2007 | Raes et al. | | |
| 7,976,279 B2 * | 7/2011 | Raes | ........................ | B64C 11/38 |
| | | | | 416/155 |

(Continued)

OTHER PUBLICATIONS

Extended European Search Report or the partial European Search Report/Declaration of no search for International Application No. 16305508.0, dated Nov. 29, 2016, 5 pages.

*Primary Examiner* — Dwayne J White
*Assistant Examiner* — Maranatha Boardman
(74) *Attorney, Agent, or Firm* — Cantor Colburn LLP

(57) ABSTRACT

A blade pitch adjustment system comprising a yoke arranged to be moved in a first direction in response to an actuator; a plurality of trunnion pins arranged to be attached to a respective propeller blade; a respective contact surface between the yoke and each trunnion pin such that movement of the yoke causes rotation of the blades, and wherein the contact surfaces differ so as to create different angles of rotation of the blades at different points of yoke movement or actuator stroke.

7 Claims, 5 Drawing Sheets

(56) References Cited

U.S. PATENT DOCUMENTS

Figure 1:
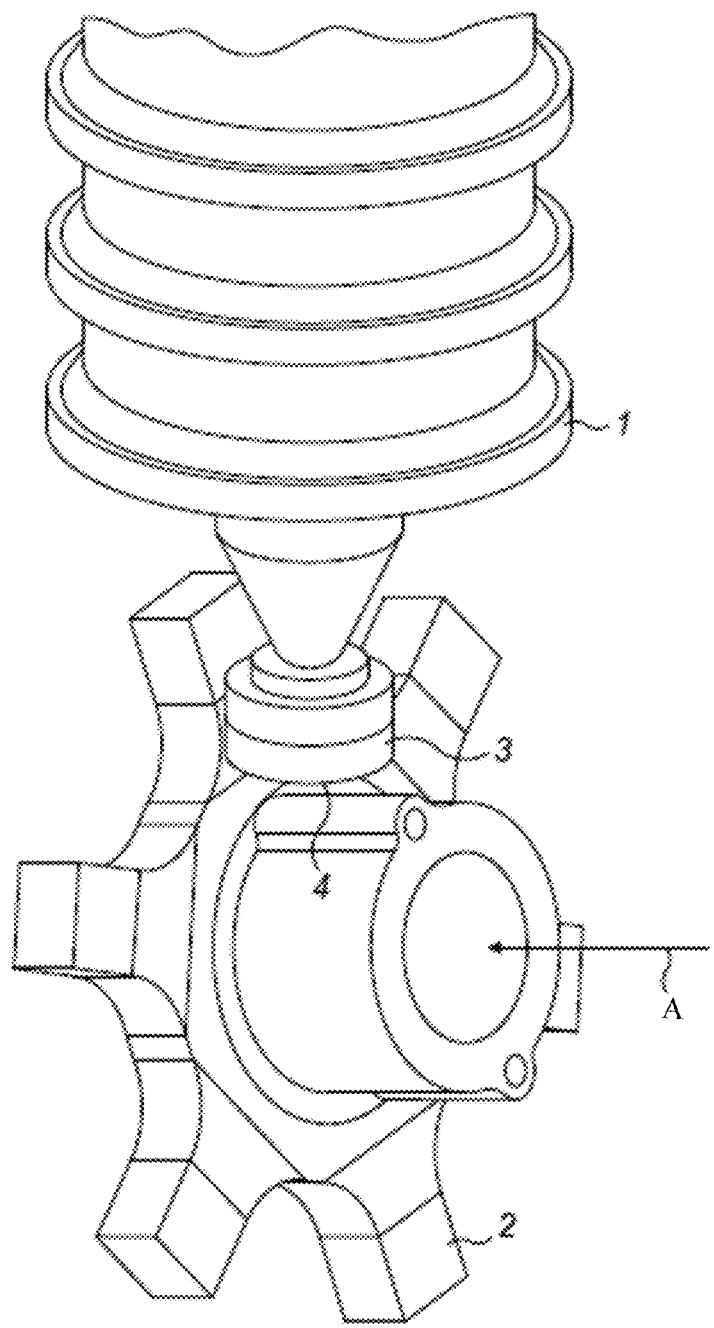

| | | | | |
|---|---|---|---|---|
| 8,043,063 B2* | 10/2011 | Kelly | ........................ | F01D 5/10 |
| | | | | 415/119 |
| 8,109,728 B2 | 2/2012 | Neitzke et al. | | |
| 8,529,205 B2 | 9/2013 | Perkinson | | |
| 9,097,125 B2* | 8/2015 | Ghorbani Zarimahalleh | .............. | |
| | | | | F04D 29/666 |
| 9,540,094 B2* | 1/2017 | Negulescu | .............. | B64C 11/18 |
| 10,054,133 B2* | 8/2018 | Julienne | ................ | F04D 29/667 |
| 2004/0197187 A1* | 10/2004 | Usab, Jr. | .................. | F01D 5/142 |
| | | | | 415/1 |
| 2011/0277447 A1* | 11/2011 | Sturmer | ................ | B64C 11/308 |
| | | | | 60/224 |
| 2013/0230383 A1* | 9/2013 | Todorovic | .............. | F01D 5/3007 |
| | | | | 415/13 |
| 2014/0064968 A1* | 3/2014 | Negulescu | .............. | B64C 11/18 |
| | | | | 416/128 |
| 2015/0147181 A1 | 5/2015 | Henze et al. | | |

\* cited by examiner

BLADE PITCH CONTROL

FOREIGN PRIORITY

This application claims priority to European Patent Application No. 16305508.0 filed May 2, 2016, the entire contents of which are incorporated herein by reference.

TECHNICAL FIELD

The present disclosure is concerned with adjusting the pitch of propeller blades in an aircraft.

BACKGROUND

Aircraft propellers comprise a plurality of propeller blades extending from a hub. During flight it is necessary, at times, to adjust the pitch of the blades relative to the air flow, to match flight conditions e.g. for take-off, climbing, descending, or landing in order to keep the propeller rotation speed constant.

In U.S. Pat. No. 5,199,850, pitch change is effectuated by a ballscrew and a ballscrew nut assembly that is responsive to a mechanical differential gearing that imports rotary motion to the ballscrew that, in turn, translates the ballscrew nut. The ballscrew nut is attached to the root of the propeller blade through a yoke, trunnion and a connecting link for increasing and decreasing the pitch of the blade. Each blade includes the trunnion and the connection link and the blades are moved in unison so that the blade angles are uniformly changed.

A similar system is taught in U.S. Pat. No. 7,296,969 and in U.S. Pat. No. 8,529,205.

In these conventional systems, all the blades are affected in the same way—i.e. the pitch change is the same for all blades.

A problem with conventional systems is propeller noise which can be high due to the blades having the same pitch and thus generating noise at the same frequency.

One attempt to reduce propeller noise is described in US 2015/0147181 in which the propeller blades are arranged in groups having different geometric characteristics. The different shapes will generate different noise signatures over a wider range of frequencies, providing a lower-noise propeller system. Such a system, however, is more manufacturing-intensive as different shaped blades are required in each propeller.

U.S. Pat. No. 8,109,728 teaches a system for adjusting the pitch angle of propeller blades where different groups of blades are rotated through different pitch angle ranges.

BRIEF DESCRIPTION

An aim of the present disclosure is to provide a propeller pitch change system in which the blades are not all adjusted to the same pitch.

This objective is achieved by providing a contact surface between the trunnion pins and the yoke so that axial motion of the yoke relative to the trunnion pin causes different pitches or degrees of rotation of the respective blades.

The contact surfaces between the yoke and the trunnion pin as the yoke transits define a profile that results in different trunnion pins being driven to rotate the respective blades by different amounts as the yoke moves along the axis A. The pitch-to-actuator motion function then has a function dependent on the profile.

According to one aspect, the disclosure provides a blade pitch adjustment system comprising a yoke arranged to be moved along a first axis; a plurality of trunnion pins arranged to be attached to respective propeller blades; a respective contact surface between the yoke and each of the trunnion pins such that movement of the yoke along the first axis results in rotation of the blades, and wherein the contact surfaces are configured such that as the yoke moves along the first axis some or all of the blades are rotated to have an angle of rotation different from that of others of the blades.

The contact surfaces may be formed on the yoke, on the trunnion pins and/or may be provided by separate a component, e.g. a plate, between the yoke and the trunnion pin.

According to another aspect, there is provided a propeller system comprising a plurality of blades and a blade pitch adjustment system as defined above, the blade pitch adjustment system comprising a plurality of trunnion pins, wherein each trunnion pin is attached to a respective blade for rotation of the blade by movement of a yoke in the blade pitch adjustment system above.

The propeller system may also include an actuator for causing movement of the yoke, or the yoke may be a part of the actuator.

The contact surface is different for at least one trunnion pin compared to the other(s), and may be different for each trunnion pin or for pairs or sets of diametrically opposite trunnion pins.

The blades may all have identical geometric characteristics or may not all be geometrically identical (as for the blades described in US 2015/0147181).

Preferred embodiments will now be described, by way of example only, with reference to the drawings.

DRAWINGS

Figure 2A:
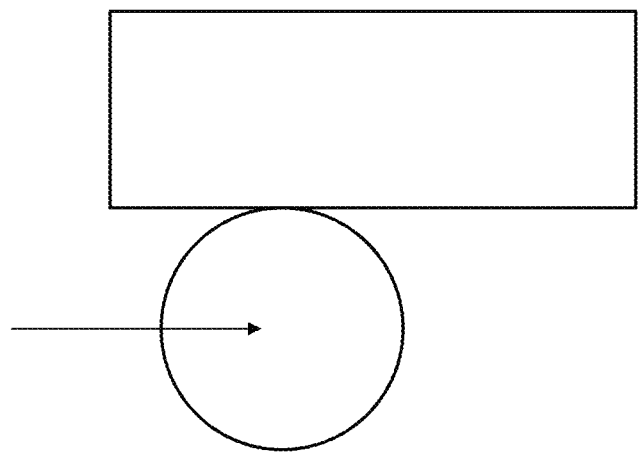
Figure 2B:
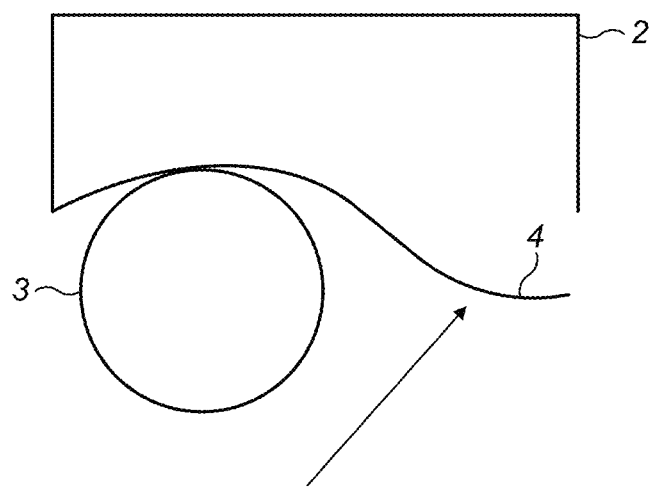
Figure 3:
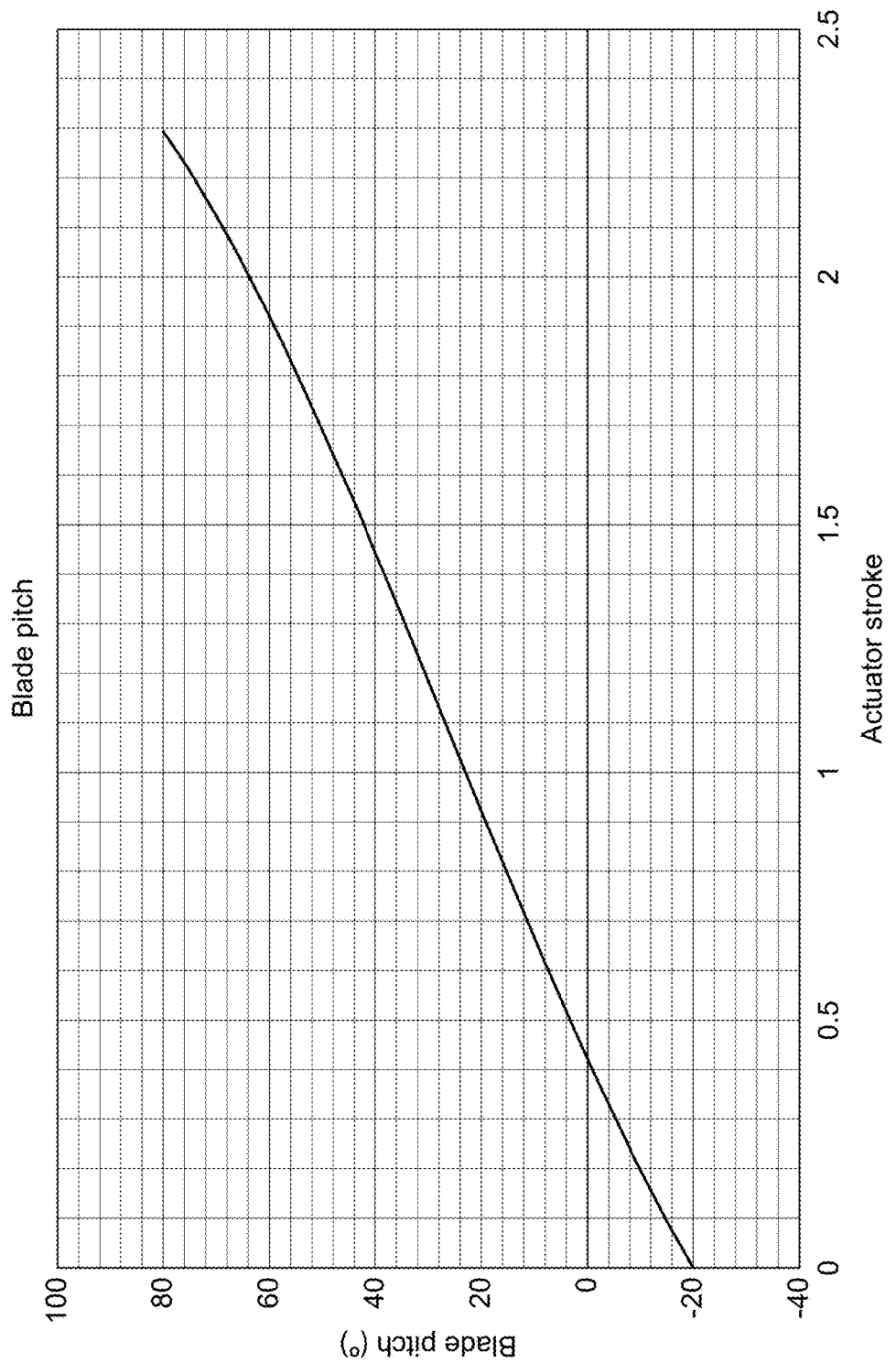
Figure 4:
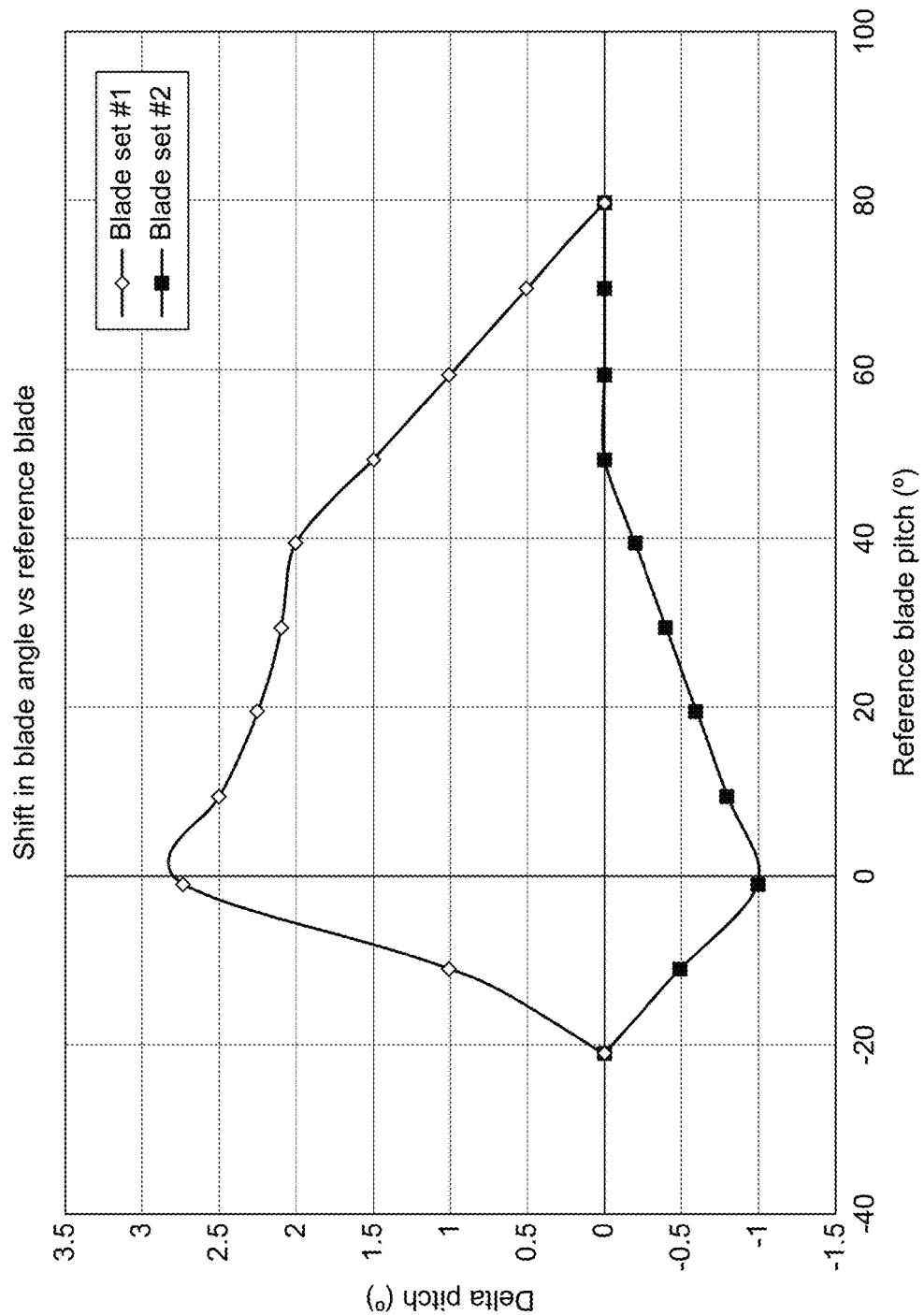
Figure 5:
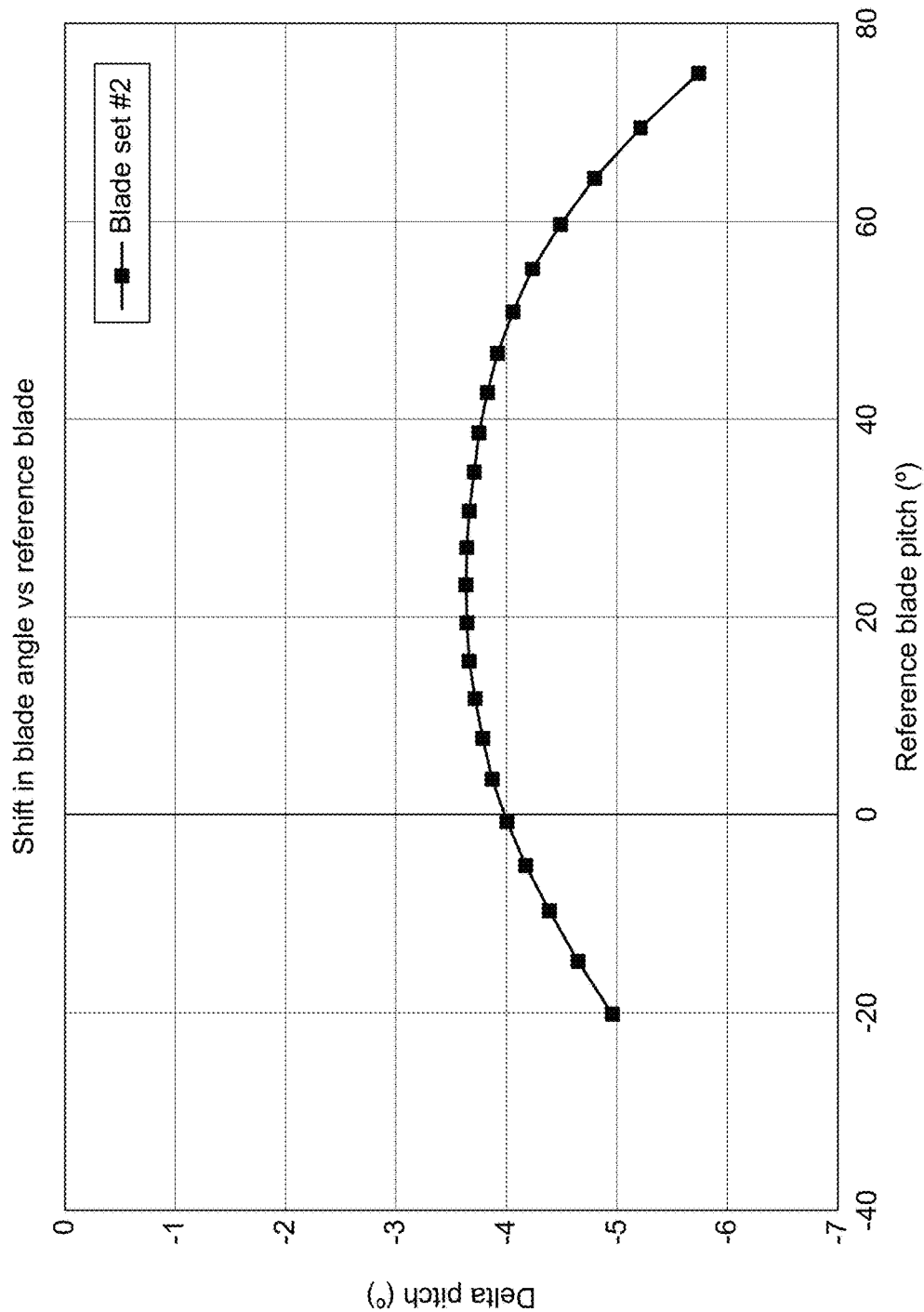

FIG. 1 is a perspective view of a pitch adjustment system.
FIG. 2A shows a contact surface of conventional systems.
FIG. 2B shows a contact surface of the present system.
FIG. 3 shows a relationship between actuator stroke and blade pitch for a conventional system.
FIG. 4 shows a desired pitch shift between blades.
FIG. 5 shows how the blade pitch shifts as the contact surface is translated for a given blade.

DETAILED DESCRIPTION

A conventional pitch change mechanism comprises each of a plurality of propeller blades attached to a yoke by means of a respective offset trunnion pin. An actuator, e.g. a hydraulic piston or the like is controlled to move the yoke to change the pitch of the blades. The trunnion pins are received by the yoke at one end and are attached to respective blades, offset from the blade axis, at the other end. As the yoke transits axially, due to the actuator, the trunnion pins are rotated in an arcuate manner to cause a pitch change in the blades. Because the trunnion pins are offset relative to the blade axes, axial movement of the yoke, caused by the actuator, results in rotation of the blades about a change axis or, in other words, a pitch change of the blades.

FIG. 1 shows the main components of a pitch adjustment system in which the present invention can be incorporated.

A propeller includes a plurality of blades 1 only one of which is partially shown in FIG. 1. The adjustment of the pitch of the blade is caused by movement of a yoke 2 in the direction of the arrow, due to operation of an actuator (not shown).

For each blade, a trunnion pin 3 is provided defining a contact surface between the yoke and the blade. The trunnion pin is offset relative to the axis of the blade and is connected to the yoke by means of a bearing assembly.

To adjust the pitch of the blade, the actuator causes the yoke 2 to transit in the direction of the arrow A causing the blade to rotate and change its pitch.

During transition of the yoke 2, if the yoke rotates with the trunnion pins 3, there will be no relative movement at the contact surface between the yoke 2 and the pins 3. To avoid this problem it is known to provide the yoke with an anti-rotation device (not shown) also known as an anti-torque arm, to ensure the yoke does not rotate with the pins as it translates.

As mentioned above, in prior art systems, the contact surfaces between the yoke 2 and the trunnion pin 3 are essentially the same—i.e. the same 'attack' is made to all trunnion pins, and, hence, all blades during axial movement of the yoke as shown in FIG. 2A which causes the pitch of the blades to vary with respect to actuator stroke.

FIG. 3 shows a typical relationship between blade pitch or angle and actuator stroke. This relationship results from a surface contact between pin and the yoke which is planar and perpendicular to the axis A.

As mentioned above, there is a desire to reduce noise, and the system of this disclosure has been designed to achieve this by introducing a difference in pitch between different blades or sets of blades (for stability it is desireable for diametrically opposite blades to have substantially the same pitch but different from that of other pairs or sets of diametrically opposite blades). This is represented in the graph of FIG. 4.

To achieve this, the relationship of FIG. 3 needs to be adapted. In the present disclosure, this is done by changing the location of the contact point between the respective trunnion pins and the yoke.

In the present disclosure, the pitch of the blades can be made more individual by providing a different contact surface 4 between the yoke 2 and some or all of the trunnion pins 3, an example of which is shown in FIG. 2B.

In one example, a profile is machined into the surface of the yoke for contacting the trunnion pins at different positions of yoke transition. Other ways can be conceived of providing this profile, for example by providing a profiled plate or other component between the trunnion pins and the yoke. Alternatively (but not shown) the profile can be machined into the surface of the trunnion pins 3.

FIG. 5 shows how blade pitch shifts for an offset contact surface during actuator stroke.

Pitch angles are typically provided to manage propeller speed and power and can range from a so-called fully feathered minimum drag angle, to a pitch angle that provides reverse thrust.

During propeller reverse transition, there is a time where no torque is absorbed by the propeller blades. The zone associated with this time is known as the 'keep out zone'. During this time zone, the propeller speed regulation with pitch variation is not possible and an engine fuel flow control needs to be implemented in order to avoid propeller overspeed.

The independent pitch angle adjustment mechanism of the present disclosure also results in the ability to suppress the keep out zone. Because the present disclosure allows each blade to have its pitch adjusted according to an individual function, not all blades need to be in the keep out zone at the same time when the propeller goes into reverse transition. It is possible, therefore, to have some blades consuming torque and power while the full reverse capability of the propeller is conserved.

Further advantages of the individual pitch adjustment capabilities of the present disclosure mean that the best aerodynamic compromise can be obtained for different flight conditions.

The invention claimed is:

1. A blade pitch adjustment system comprising a yoke arranged to be moved along a first axis (A); a plurality of trunnion pins arranged to be attached to respective propeller blades; a respective contact surface between the yoke and each of the trunnion pins such that movement of the yoke along the first axis (A) results in rotation of the blades, and wherein at least one contact surface has a profile different from other contact surfaces such that as the yoke moves along the first axis (A) some or all of the blades are rotated to have an angle of rotation different from that of others of the blades.

2. The system of claim 1, wherein the contact surfaces for diametrically opposite blades are similarly configured, such that the diametrically opposite blades have substantially the same angle of rotation.

3. The system of claim 1, wherein the contact surfaces are defined on a surface of the yoke.

4. The system of claim 1, wherein the contact surfaces are defined on a surface of the trunnion pin(s).

5. A propeller system comprising a plurality of blades and a blade pitch adjustment system as claimed in claim 1, the blade pitch adjustment system comprising a plurality of trunnion pins, wherein each trunnion pin is attached to a respective blade for rotation of the blade by movement of a yoke in the blade pitch adjustment system above.

6. The propeller system of claim 5, wherein the blades all have identical geometric characteristics.

7. The propeller system of claim 5, wherein the blades do not all have identical geometric characteristics.

* * * * *